Patented May 13, 1941

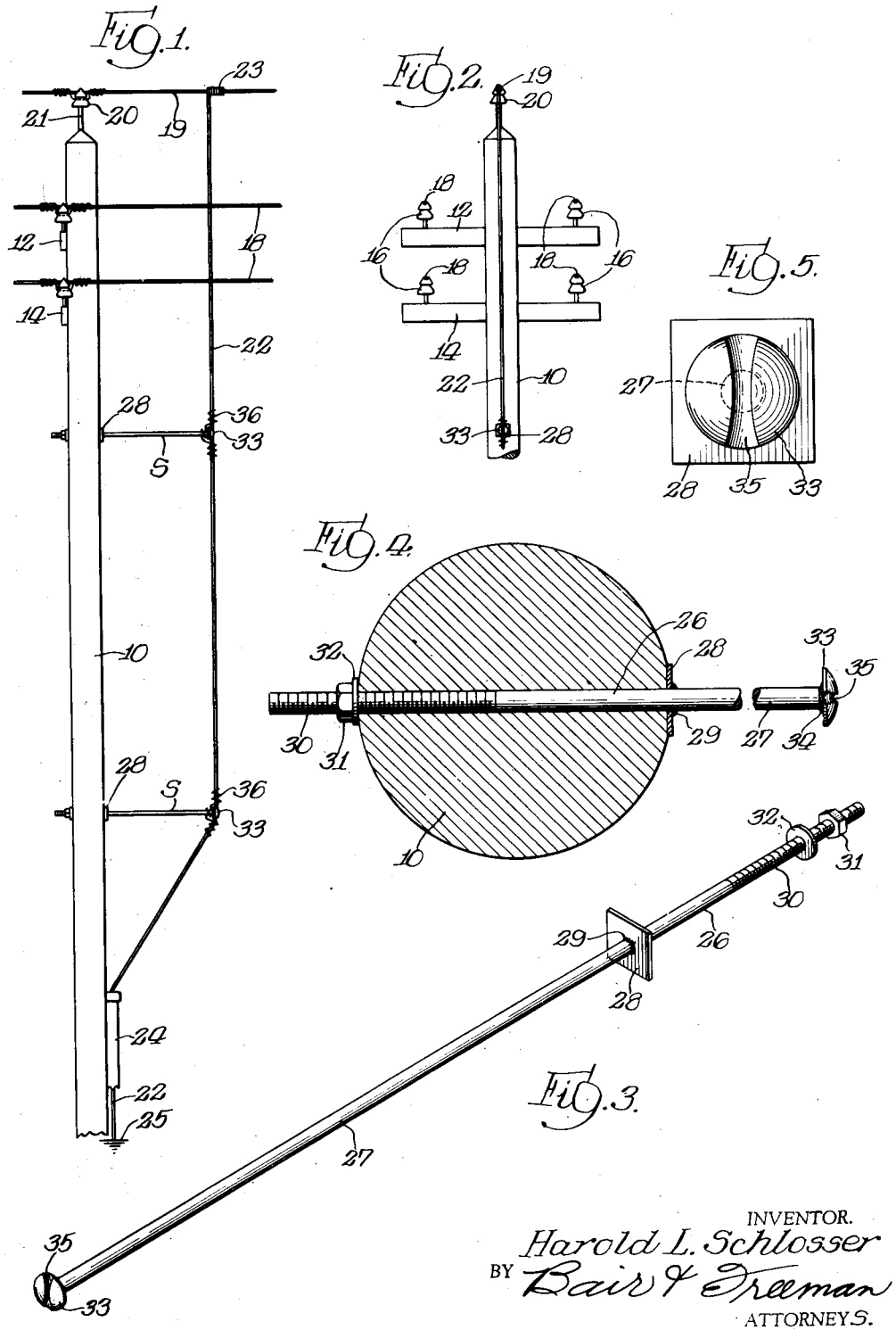

2,241,739

UNITED STATES PATENT OFFICE 2,241,739

STATIC WIRE GROUND LEAD SUPPORT

Harold L. Schlosser, Defiance, Ohio, assignor to Lectrolite Corporation, Defiance, Ohio, a corporation of Ohio Application July 31, 1939, Serial No. 287,598

1 Claim. (Cl. 248—71)

An object of my invention is to provide a support for static wire ground leads, which support is comparatively simple and inexpensive to manufacture.

A further object is to provide a support in the form of a rod having means at one end to rigidly connect the support to a pole so that the major portion of the rod extends at substantially right angles to the pole and terminates in an enlarged head to coact with a static wire ground lead and a tie wire for the lead so that the lead may be supported on the head.

A further object is to provide a ground wire lead support adapted to support the lead in a position substantially spaced from the pole and from the cross arms of the pole, thus increasing the distance between the lead and the cross arms in order to minimize static leakage and increase the lightning protection possibilities of a static wire system to the maximum.

Still a further object is to provide a support which can be readily fabricated from a rod having a head and a shoulder plate welded thereto, the rod being threaded at one end to coact with a nut.

With these and other objects in view, my invention with respect to its features which I believe to be novel and patentable will be pointed out in the claim appended hereto. For a better detailed understanding of the invention, and further objects relating to details of economy of my invention, reference is made to the following description and to the accompanying drawing wherein such further objects will definitely appear, and in which Figure 1 is a side elevation of a pole including line wires, a static wire, a static wire ground lead and a pair of the supports constituting my invention installed in conjunction therewith;

Figure 2 is a front elevation of the pole;

Figure 3 is an enlarged perspective view showing one of my static wire ground lead supports;

Figure 4 is a sectional view through a pole showing my support associated therewith and a shoulder plate of the support shown in section, and Figure 5 is an enlarged end view of the support as viewed in Figure 2.

On the accompanying drawing I have used the reference numeral 10 to indicate a pole. Cross arms 12 and 14 are mounted thereon. On the cross arms 12 and 14 are insulators 16 supporting live line wires 18.

Line wires such as 18 are usually protected from lightning by a "static" wire 19 supported on an insulator 20. The insulator 20 in turn is supported on a rod 21, the lower end of which may be threaded and screwed into the upper end of the pole 10. A static wire ground lead 22 is connected as at 23 to the static wire 19 and extends downwardly therefrom. It is supported by one or more of my supports indicated generally at S and may finally be deflected toward the pole 10 and passed downwardly through a molding 24 to the ground indicated at 25.

My support S comprises a rod having a short portion 26 and a long portion 27. The portions 26 and 27 are separated by a shoulder plate 28 which may be connected as by welding 29 to the rod S. The portion 26 is threaded as at 30 and a nut 31 coacts therewith. A washer 32 is provided on the rod portion 26.

A relatively long portion 27 of the supporting rod S terminates in an enlarged head 33 which may be welded as at 34 to the supporting rod. The head 33 is grooved as at 35 to receive the ground lead 22, which ground lead merely rests in the groove and is retained therein by a tie wire 36.

Heretofore it has been customary to make the connection 23 of the ground lead 22 to the static wire 19 adjacent the insulator 20 and then run the lead 22 downwardly along the pole 10, fastening it to the pole with staples or the like. This arrangement, however, provides a relatively short path for lightning from the line wires 18 along the cross arms 12 and 14 when wet to "ground." Ground, in this case (that is, the "effective" ground), is the ground lead along the pole. The distance of travel therefore is merely the length of the cross arm on one side of the pole.

When my support S is used, however, the distance from the line wire 18 to effective ground is considerably increased inasmuch as the distance from the cross arm 14 down to the support S is added to the length of the cross arm on one side of the pole. The ground lead 22 is kept a considerable distance away from the pole and the cross arms until it gets down to the support S, so that there is a substantial air gap between the pole and the lead and between the line wires 18 and the lead. By mounting the support S well below the lower cross arm 14, the likelihood of static discharges to or from the wires 18 is minimized.

If desired only one of the supports S need be used as the lead 22 can be swung in toward the pole after passing it, instead of extending down to a second one and then swung in to the pole, as illustrated in Figure 1. I provide an economical device to serve as a support for the lead 22 which can be readily installed and rigidly mounted on the pole by boring a hole through the pole, thrusting the portion 26 of the support through the hole and applying the washer 32 and the nut 31. My support also spaces the ground lead 22 a substantial distance from the pole 10 so that it does not interfere with a lineman climbing the pole. The square shape of the plate 28 prevents turning of the support S.

While I have shown a particular embodiment of my invention, it will be understood of course that I do not wish to be limited thereto since many modifications may be made, and I therefore contemplate by the claim appended hereto to cover any such modifications or substitutions of mechanical equivalents as fall within the true spirit and scope of my invention without sacrificing any of its advantages.

I claim as new and desire to secure by Letters Patent of the United States:

In a static wire ground lead support, a rod, a shoulder plate welded thereon intermediate the ends thereof, the portion of said rod on one side of said shoulder plate being threaded and adapted to pass through a pole, a nut for retaining said portion in the pole and said shoulder plate against one surface thereof whereby the portion of said rod on the opposite side of said shoulder plate is rigidly supported in a position extending at substantially right angles to the axis of the pole, said last portion of said rod terminating a substantial distance from the pole, and an integral grooved enlargement on the outer end of said rod and adapted to coact with a static wire ground lead to hold the same spaced a distance away from the pole greater than the distance between the pole and a line wire on the cross arm thereof and with a tie wire for tying said lead to said enlargement.

HAROLD L. SCHLOSSER.